Figure 2:
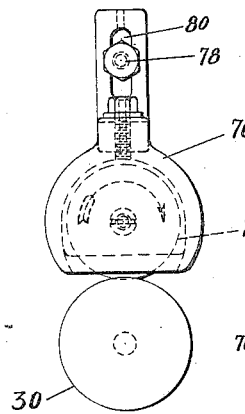

Oct. 8, 1935.  M. W. HOWARD  2,016,330

SKIN TRIMMING MACHINE

Filed Aug. 28, 1933

Inventor
Merton W. Howard
By Kenway + Witter
Attorneys

Patented Oct. 8, 1935

2,016,330

UNITED STATES PATENT OFFICE 2,016,330

SKIN TRIMMING MACHINE

Merton W. Howard, Haverhill, Mass., assignor to Pope Machinery Corporation, Haverhill, Mass., a corporation of Massachusetts Application August 28, 1933, Serial No. 687,107

4 Claims. (Cl. 164—61)

This invention relates to improvements in skin trimming machines as used in tanneries and has for its primary object the provision of a simple and efficient machine adapted for the purpose of trimming the ragged points and edges from skins, to remove the useless material and improve the appearance as well as facilitate the subsequent cutting into shoe uppers, pocketbooks and other leather products. Heretofore it has been the custom to remove this useless leather by cutting it off with a knife or shears by hand and, to some extent, with a power driven reciprocating knife. One object of the invention is to provide an improved machine by means of which this trimming operation may be more expeditiously and economically performed.

The invention embodies the use of a circular rotary knife or cutter driven by suitable power means and a cooperating idler or non-driven shearing wheel in overlapping relation therewith, so combined and mounted as to perform the object of the invention with great facility. I have found that the extent of overlapping and the relative spacing of the knife and wheel are of great importance and my invention embodies the use of a novel mounting arrangement whereby these relations may be conveniently secured to a fine and efficient degree. One feature of this arrangement embodies a bearing and cooperating means frictionally supporting a quill which in turn supports the shearing wheel for only rotary movement relative thereto. Convenient means is provided for finely adjusting the quill axially to secure a proper spacing of the wheel and cutter and other means is provided for adjusting the bearing transversely to secure the proper overlap. The production of such an improved combination for the purpose stated and also of a substantially semi-spherical head portion on the shearing wheel for supporting the work more conveniently comprises a further object of the invention.

These machines perform more efficiently when the work is received and operated upon by the cutter in a neutral manner, that is, when there is no tendency for the cutter to draw or feed the work thereinto and when there is substantially no resistance offered to the feeding of the work thereto. I have discovered a method of securing this neutral feeding effect by balancing the work feeding tendency of the cutter against the cutting and other resistance offered to the feeding of the work. This method consists in adjusting the cutter and wheel to a neutral overlapping relation as hereinafter more specifically described and the production of this novel feeding effect comprises a further object of the invention.

Figure 1:
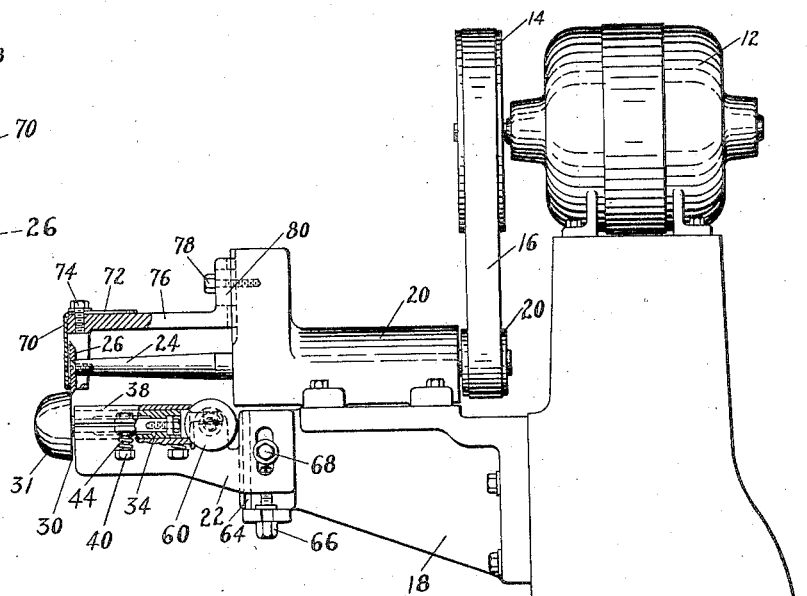
Figure 3:
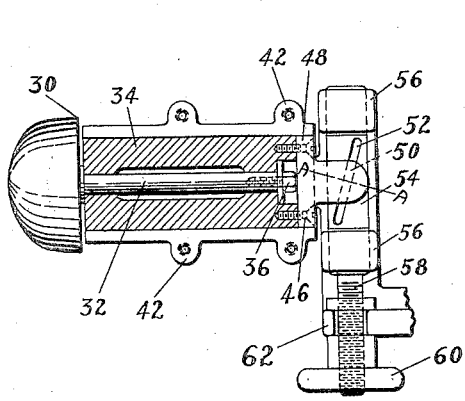
Figure 4:
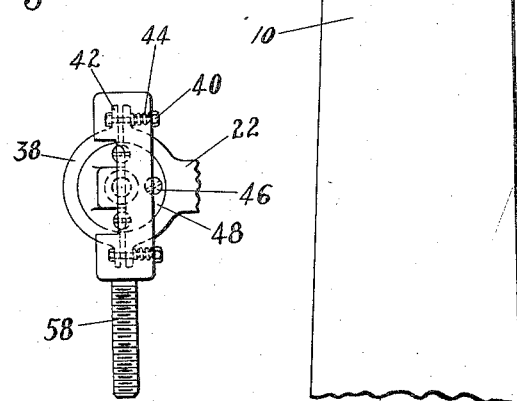
Figure 5:
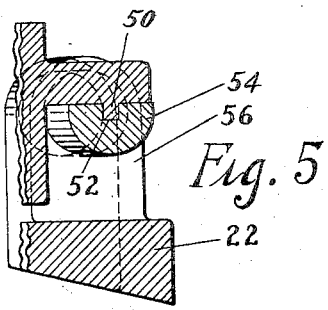

These and other features of the invention will be best understood and appreciated from the following description of a preferred embodiment thereof, selected for purposes of illustration and shown in the accompanying drawing, in which Fig. 1 is a side elevation of a machine embodying my invention, some portions being cut away and shown in section, Fig. 2 is an end view of the cutter head, Fig. 3 is a plan view of a portion of Fig. 1, the quill bearing being shown in horizontal section, Fig. 4 is an inner end view of a portion of Fig. 3, and Fig. 5 is a fragmentary sectional view on line A—A of Fig. 3.

The machine illustrated in the drawing is designed especially for the trimming of skins of upper leather. There is provided a frame 10 which can be arranged for bench or floor mounting, and a motor 12 thereon carries a pulley 14 fitted with a driving belt 16. Secured to the front face of the frame 10 is a bracket 18 which provides a mounting for a spindle housing 20 and also for a bracket 22. A cutter spindle or shaft 24 is mounted in the housing 20 and carries the rotary knife or cutter 26 on its forward end. A pulley 28 on the rear end of the shaft is in alignment with and connected to the pulley 14 by the belt 16. The arrangement is such as to drive the cutter at a relatively high speed, the cutter speed which I have used in these machines being in excess of 5000 R. P. M.

Cooperating with the cutter 26 is a normally idle shearing wheel 30 having a substantially plane rear face opposed to the substantially plane front face of the knife when the two faces are in overlapping relation. The shearing wheel is mounted on the front end of a shaft 32 rotatable within a quill 34, the wheel being spaced from the end of the quill and being secured against axial movement therein by means including a cap screw 36. The quill is supported within a bearing, the lower half of which is integral with the bracket 22, the upper half being indicated by the numeral 38. These two halves are held together by bolts 40 passing through ears 42 and, in order to grip the quill therebetween with a predetermined frictional contact, compression springs 44 are provided on the bolts. Thus the quill is normally held against any movement within the bearing. The shearing wheel is provided with an outer substantially semi-spherical head portion 31 which aids in steadying and feeding the work to the cutter.

Secured to the inner end of the quill by screws 46 is a member 48 having a downwardly projecting tongue 50 adjacent to its free end. This tongue has a sliding fit within an inclined slot 52 in a block 54, the block being slidable longitudinally within bosses 56. The block carries a threaded stud 58 on which is threaded a hand wheel 60, the hand wheel being prevented from endwise movement by being journalled within the bracket 22 at 62. It will be apparent that rotation of the hand wheel serves to adjust the block and quill longitudinally, all as hereinafter described.

The inner end of the bracket 22 is fitted to slide vertically on the guideway 64 of the bracket 18 and a screw 66 is provided for adjusting the bracket 22 along this guideway. The bracket may be secured in adjusted position by means of a locking bolt 68. The substantially plane faces of the cutter and shearing wheel overlap each other, as illustrated, and it will be apparent that the extent of this overlap may be varied as desired by rotating the screw 66.

It is desirable that the cutter and shearing wheel be not in direct contact but that they should have a very slight clearance therebetween. Such a relation prevents any friction between these elements and permits the shearing wheel to hold the work close up to the point of cutting. I have found that a clearance of one to two ten-thousandths of an inch is very satisfactory, and to insure that so fine a setting as this can be made by the average operator requires special adjusting means such as above described.

It will be apparent that the wheel 30 and its shaft 32 are normally held against axial movement by the frictional grip of the bearing 38 against the quill 34, caused and maintained by the springs 44. To adjust the shearing wheel axially whereby to change the spacing thereof relative to the cutter requires simply a rotation of the hand wheel 60. Such rotation causes only a slight movement of the block 54 and, since the slot 52 is formed at a relatively small angle to the line of such movement, the resulting adjustment to the quill is very minute. Thus not only can the very fine adjustment requirement be easily and accurately secured but the novel mechanism provides for making this adjustment simply by rotating the hand wheel 60. It will, therefore, be obvious that this feature of the invention is of great importance in that it permits a fine adjustment to be made with minimum effort and by the average operator.

The skins to be trimmed are brought to the operator in bundles and are fed one at a time to the machine. The operator presents the skin to the cutter by passing it over the head portion 31 of the shearing wheel which portion serves to partially support and steady the work and renders its feeding to the cutter more accurate. In this manner the operator feeds the useless and objectionable tips and curled edges to the cutter and shearing wheel, thus "trimming the skin".

The machine, as illustrated, can be arranged to receive the work from left to right or right to left with equal facility. As shown in the drawing the feeding is from right to left (Fig. 2). The shearing wheel, being free to rotate on its bearings, interposes only slight resistance to the feeding, while the power driven rotary cutter tends to cause work feeding, being arranged to rotate in such direction as to cause that portion of the cutter which is in engagement with the work to move in the same general direction as the work moves, and faster than the fastest feeding movement of the work by the operator.

Any cutting edge, and especially a ground edge as used on this machine, is made up of a series of microscopic teeth, as is well understood by those versed in the mechanical arts. It is these teeth moving in the same general direction as and faster than the feeding movement of the work which cause the work feeding tendency.

It is evident that, if these teeth at the point of engagement with the work are moving in very nearly the same direction as the work moves, the work feeding tendency will be the greatest possible to be obtained. This condition occurs when the cutter and the shearing wheel overlap each other only a few thousandths of an inch, or just enough to insure cutting through the leather. At the opposite extreme, if the two members overlap enough so that the cutter teeth at the point of engagement with the work are moving in a direction nearly at right angles to the direction in which the work moves, no work feeding tendency will be produced. By a simple, and not at all critical adjustment of the overlap of the cutter and shearing wheel, a condition may be had under which there is neither work feeding nor resistance to feeding, which condition we may call one of neutral feeding. In practice an overlap of about $\frac{1}{16}$ inch has been found to produce best results.

To secure the neutral feeding, the shearing wheel 30 is raised or lowered by loosening locking bolt 68 and raising or lowering the bracket 22 by means of screw 66 to cause more or less overlapping of the shearing wheel and the cutter until the desired result is obtained, after which the adjustment is maintained by tightening the bolt 68. This adjustment is infrequent, change being required only because of some substantial change in cutter or skin condition, but whatever condition is confronted, compensating adjustment can be made to secure the neutral feeding. It will be quite obvious that the neutral feeding function is made possible only by combining the driven cutter with the idler shearing wheel, the latter acting in conjunction with the former to balance and neutralize the work feeding effect thereof. Two rotary and driven cutters in overlapping relation have been known and used heretofore but both such cutters act to draw the work thereinto and cannot function in the neutral work feeding manner and for the purpose of the invention as herein described.

Skins of leather in the condition in which the trimming operation occurs are soft and pliable and often limp in character. It will be obvious that special mechanism is required to trim such skins and that the neutral feeding effect secured in my machine as above described is of particular advantage since it permits the soft and pliable tips and edges of the skins to be pasted freely to the cutting mechanism without either feeding or resistance forces acting thereon.

A guard 70 has a vertical portion extending over the cutting wheel 26 and this guard is preferably mounted in a novel manner permitting easy access to the cutter. The horizontal portion of the guard is slotted at 72 and a bolt 74 extends through this slot and into a supporting bracket 76 secured to the housing 20 by a bolt 78 extending through a slot 80, the slot 80 permitting vertical adjustment of the guard and bracket. Access to the cutter may be had simply by loosening the bolt 74, drawing the guard forwardly and then turning it to one side about the bolt as an axis.

The novel features and improvements comprising my invention are now believed to be apparent and the advantages thereof, particularly over the reciprocating knife machines, are believed to be obvious. Such machines are violent in action, and have short life due to the reciprocating parts, and only a small fraction of an inch of reciprocation and consequently of knife motion can be used on account of the excessive vibration. This short knife section quickly becomes dull and even when freshly sharpened the work must be pushed or pulled past it, as from its nature and arrangement it cannot render any assistance to the feeding movement. The machine of my invention is quiet and smooth running, by reason of its simple, continuous rotary movement, and has several inches of knife edge with which to do the cutting, thus greatly extending the hours of service the knife will give before resharpening is necessary. It is believed that the improvements of my invention in such a machine of the rotary type has produced a very superior trimming machine for the purpose stated.

Having thus described my invention, what I claim as new and desire to secure by Letters Patent of the United States is:

1. In a skin trimming machine, a circular rotary knife, means for driving the knife, an idler shaft, a shearing wheel thereon cooperating in overlapping relation with the knife, a quill supporting the shaft rotatably and against axial movement therein, a bearing surrounding and frictionally supporting the quill against axial movement, and means for giving the quill an axial adjustment without releasing said frictional engagement of the bearing therewith.

2. In a skin trimming machine, a shaft, a circular rotary knife on one end thereof, means for driving the shaft and knife, an idler shaft parallel with the first named shaft, a shearing wheel on one end thereof cooperating in overlapping relation with the knife, a quill supporting the idler shaft rotatably and against axial movement therein, a bearing surrounding and frictionally supporting the quill against axial movement, means for giving the quill an axial adjustment without releasing said frictional engagement of the bearing therewith, and means for adjusting the bearing toward and from the knife shaft.

3. The method of trimming relatively soft skins and the like by means of a circular rotary knife, which consists in supporting the skin to be trimmed upon an idler shearing wheel serving as a freely rotatable support for the skins at such a distance below the axis of the knife and above the lowermost peripheral point of the cutting edge thereof as substantially to balance the tendency of the knife to advance the skin against the cutting resistance of the knife to the feeding of the skin and thus maintain the skin in a neutral feeding condition relative to the knife.

4. A skin trimming machine comprising a rotatable knife having a cutting edge at its periphery, means for rotating the knife at relatively high speed, an idler shearing wheel in overlapping relation with said cutting edge and having its axis of rotation parallel with the axis of rotation of the knife, means providing for a relative adjustment and holding of the knife and wheel parallel with the rotary axes thereof whereby they may be located closely adjacent to but out of contact with each other, and means providing for a relative adjustment and holding of the knife and wheel transversely of the rotary axes thereof whereby they may be located in such overlapping relation that the resistance encountered by the work in the cutting operation and in rotating the shearing wheel substantially balances the feeding tendency of the knife on the work and thereby neutralize each other, the machine having no feeding contact with the work except through the said cutting edge of the knife.

MERTON W. HOWARD.